UNITED STATES PATENT OFFICE 2,497,637

LAMINATES AND POLYMERS OF ALKENYL ESTERS OF ARYLPHOSPHONIC ACIDS

Arthur Dock Fon Toy, Chicago, Ill., assignor to Victor Chemical Works, a corporation of Illinois No Drawing. Application December 6, 1945, Serial No. 633,272

14 Claims. (Cl. 154—43)

This invention relates to the preparation of polymers of alkenyl esters of arylphosphonic acids and to the polymers themselves.

In my co-pending application, Serial No. 625,459, filed October 29, 1945, and issued as U. S. Patent 2,425,765, dated August 19, 1947, there is disclosed the preparation of monomeric alkenyl esters of arylphosphonic acids. These esters might be polymerized to give strong, tough, clear resins useful for a variety of purposes.

The polymerized products of the present invention include products of various degrees of polymerization, the products ranging from viscous oils to solid, clear resins, and having various utilities including those of solvents, plasticizing and resin modifying agents, coating agents, and finished solid resin products. Also copolymers of the various monomeric starting esters are intended to be within the scope of the present invention.

The monomers may be prepared in any desired manner, but the methods disclosed in my co-pending application, above referred to, are preferred and consist in general in the reaction of arylphosphorus oxydichloride with a beta, gamma alkenyl alcohol in the presence of pyridine and separating the monomeric ester from the reaction product.

The polymerizing conditions and procedures employed in producing the polymers of this invention vary over a wide range from simply heating the liquid monomers for extended periods to controlled heating of the monomers mixed with varying amounts of polymerization catalysts such as benzoyl peroxide, acetyl peroxide, oxygen, air, hydrogen peroxide, and the like at various temperatures, and for different periods of time. The type of catalyst employed has a distinct effect on the character of the resulting polymerized product. For example, in the presence of oxygen or air, the polymerization proceeds forming relatively soft solid resins. With the use of benzoyl peroxide, the polymerization can be made to proceed at such rate that hard, solid resins may be obtained. Generally, when the hard solid type resin is desired, it is advisable to carry out the polymerization in an inert atmosphere, for example, in the presence of nitrogen, carbon dioxide, hydrogen etc. The resins are of the thermosetting type and may be advantageously employed in a monomer or a partially polymerized state for impregnating glass and textile fibers and then completing the polymerization to form strong, hard laminates of high commercial value.

The beta, gamma alkenyl diesters of the arylphosphonic acids are polymerizable individually or in admixture with each other to yield valuable commercial resins.

The following examples illustrate the production of a number of these polymers or resin type products.

Example 1

Diallyl phenylphosphonate was prepared by reacting allyl alcohol with phenyl phosphorus oxydichloride in the presence of pyridine and separating the diester from the reaction mixture. The liquid diallyl phenylphosphonate having a boiling point of 126–128° C. at 1 mm. pressure was mixed with 2% by weight of benzoyl peroxide and the mixture poured between glass plates held ⅛ inch apart, and the whole heated at 75–80° C. for 17.5 hours. The ester polymerized to form a solid, strong, tough, water-white plate which could be vigorously bounced on concrete without breaking.

Example 2

Diallyl phenylphosphonate was mixed with 1% acetyl peroxide and heated in a ⅛ inch thick layer at 78° C. for 15 hours in the presence of carbon dioxide gas, yielding a solid resin.

Example 3

Dimethallyl phenylphosphonate was prepared by reacting methallyl alcohol with phenylphosphorus oxydichloride in the presence of pyridine and separating the diester from the reaction mixture. The liquid dimethallyl phenylphosphonate having a boiling point of 140–143° C. at 2–3 mm. pressure was mixed with approximately 2% by weight of benzoyl peroxide and heated for 23 hours in a stoppered bottle in the presence of nitrogen at a temperature of 77–78° C. The mixture thickened, gelled, and finally became a solid, hard, tough, slightly yellow colored, clear resin.

Example 4

In a similar manner a diallyl tolylphosphonate ester having a boiling point of 127–128° C. at 3 mm. pressure was prepared and polymerized with 2% benzoyl peroxide catalyst for 16 hours at 87–88° C. to yield a light yellow colored, hard, strong, solid resin product.

Example 5

Dimethallyl tolylphosphonate having a boiling point of 137–139° C. at 3–4 mm. pressure was mixed with 2% by weight of benzoyl peroxide and heated in the presence of nitrogen for 17 hours at 88–89° C., and 47 hours at 100° C., yielding a solid, hard, clear, water-white resin product.

Example 6

Diallyl chlorophenylphosphonate having a boiling point of 126–129° C. at 2–5 mm. pressure was prepared by reacting allyl alcohol and chlorophenylphosphorus oxydichloride in the presence of pyridine. The liquid ester was mixed with 2% benzoyl peroxide and heated for 17 hours at 88–89° C. yielding a solid, hard, tough, clear yellow colored resin product.

Example 7

In like manner dimethallyl chlorophenylphosphonate was prepared and the liquid ester heated for 23 hours at 79–80° C. in the presence of 2% by weight of benzoyl peroxide. The material solidified into a clear, yellow colored, strong, resin product.

The above examples broadly illustrate the formation of polymerized resin products by heating with polymerization catalysts the monomeric esters of the beta, gamma dialkenyl esters of arylphosphonic acids.

The exact nature of the polymerization reaction is not fully understood. Apparently, the early stage of the reaction is quite important and controls to a large degree the character of the final resin product. For example, with a large amount of catalyst present or too high initial polymerizing temperature, the polymerization proceeds to a point where a soft art gum-like resin is obtained and no further amount of heating will change this characteristic. Under other conditions the polymerization proceeds to the point where extremely hard, tough glass-like resins are obtained. Both types of resins have utility, but the polymerizing conditions must be controlled to obtain the desired type. The polymerization reaction is exothermic and the heat formed within the resin mass should be controlled in order to determine the character of the completely polymerized resin product. This is particularly true during the gel forming stage of the reaction. For example, when diallyl phenylphosphonate containing 2% benzoyl peroxide is initially heated at 98–100° C., only the art gum-like resin is obtainable, whereas if it is initially heated at 70–90° C. until the gel stage is reached, it may then be heated at a temperature up to about 120° C., and a hard, tough, solid resin obtained. The temperature attained in the polymerizing mass depends on the amount of catalyst employed, the heating temperature, the thickness of the resin mass, and the means of dissipating the reaction heat. These conditions must be worked out to suit the individual case and the examples illustrated herein are not intended to limit the invention to a particular set of conditions. The following examples are given by way of illustration only.

Example 8

20 cc. of liquid diallyl phenylphosphonate mixed with 2% benzoyl peroxide was placed in a stoppered, 2 oz. bottle equipped with a thermometer and the whole placed in an oven at 77–78° C. After 3½ hours, the temperature reached a maximum of 97–98° C. and receded to 77–78° C. after about 6.5 hours. After curing at 77–78° C. for an additional period of 12 hours, the resin product was a hard, tough, glass-like solid.

Example 9

The procedure of Example 8 was repeated except for the employment of 3% instead of 2% benzoyl peroxide. In this case, the temperature rose to 90° C. in 1½ hours and then rapidly rose to 168° C. at the end of 1¾ hours. The resulting product was a soft resin of art gum-like nature.

Example 10

The procedure of Example 9 was repeated using half of the amount of the monomer. In this case, the heat of the reaction was more readily dissipated and a hard, solid resin was obtained.

Example 11

The procedure of Example 9 was repeated with the test bottle immersed in a water bath to facilitate the dissipation of heat. In this case, the maximum temperature did not exceed 85° C. showing the greater efficiency of the water bath for removing the heat of reaction. After 47 hours at 77–85° C., the resin product was a hard, tough glass-like solid.

Example 12

The test of Example 11 was repeated where 5% benzoyl peroxide catalyst was employed instead of 3%. The temperature rose to 165° C. and an art gum-like resin was obtained.

Example 13

The test of Example 12 was repeated with half the amount of starting monomer. In this case, excessive temperatures were not obtained and after 7–8 hours a hard, glass-like resin was formed.

The following test was made to illustrate the advantage of step-wise heating and polymerization in order to shorten the total time required for the production of the hard, solid type resins.

Example 14

Diallyl phenylphosphonate was mixed with 2% by weight of benzoyl peroxide and heated for 3 hours at 87–88° C. when the mass became a stiff gel. This gel was then further heated 1 hour at 97–98° C., 1 hour at 107–108° C., and finally 1 hour at 117–118° C. The final product was a yellowish colored, hard, tough, glass-like solid.

Because of the extremely fluid nature of the monomeric esters, it is quite difficult to include a sufficient amount of the ester when impregnating fabrics and the like for the purpose of making laminated resin products. It is, therefore, preferred for applications of this nature to first produce a partially polymerized product of the desired consistency and using this viscous material for impregnation or molding purposes and then completing the polymerization to give a hard, laminated or molded product.

It has been found that by controlling the initial period of heating with various quantities of catalyst, the polymer product can be made to have any desired consistency and the product cooled to arrest polymerization or at least to slow down the rate of polymerization to such extent that the character of the partially polymerized product can be preserved over a period of days or weeks during which time many commercial applications of the product can be effected. For example, a highly viscous liquid partially polymerized diallyl phenylphosphonate may be used for fiber impregnating purposes for as much as ten (10) days before it sets into a stiff gel. The following example illustrates this point.

Example 15

Diallyl phenylphosphonate catalyzed with 2% of benzoyl peroxide was heated at 87–88° C. for the periods of time indicated in the following table, then cooled to room temperature. The viscosity of the product was determined immediately and after various periods of time to give an indication of the useful tank life of the product before solidification to a solid gel occurs.

| Time of Heating, Minutes | Viscosity, Centipoises | Days of Storage at room Temperature | Condition at end of Storage, Centipoises |
|---|---|---|---|
| 0 | 8.5 | more than 63 | gel. |
| 35 | 52 | 10 | 115. |
|  |  | 25 | partially gelled. |
| 40 | 69 | 10 | 181. |
|  |  | 25 | partially gelled. |
| 45 | 125 | 10 | 514. |
| 50 |  | Less than 20 | partially gelled. |
| 60 | 276 | 9 | Do. |

Some latitude in the tank life of the partially polymerized resins may be obtained by the use of lesser amounts of polymerization catalysts. The following example illustrates this point.

Example 16

Diallyl phenylphosphonate catalyzed with 1% of benzoyl peroxide was heated at 87–88° C. for designated periods of time, cooled to room temperature and the viscosity determined. The condition of the product was again determined after various periods of time. The results are given in the following table.

| Time of Heating | | Viscosity, Centipoises | Days of Storage at room Temperature | Condition at end of Storage |
|---|---|---|---|---|
| Hours | Minutes | | | |
| 1 | 40 | 304 | 28 | Viscous liquid. |
|  |  |  | 45 | Do. |
| 1 | 45 | 700 | 14 | Thin gel. |
| 1 | 50 | 1,590 | 10 | Do. |
| 1 | 55 |  | 0 | Do. |

In the above examples, it may be seen that the tank life of a partially polymerized diallyl phenylphosphonate having a viscosity of 276 to 304 is approximately 45 days when 1% of a polymerization catalyst is employed, and only about 9 days when 2% catalyst is employed.

The hard, tough, glass-like solid resins of this invention may be ground and polished. They are stable at temperatures of 200° C. and above, exhibiting only slight color changes over long periods of heating. They will burn in an applied flame but extinguish themselves when the flame is removed. They are insoluble in water and a number of organic liquids such as ether, benzene, acetone, alcohol, naphtha, carbon tetrachloride, etc. They are fairly resistant to the action of dilute acids and alkalies.

In order to demonstrate the commercial practicability of the hard resin products, a series of test pieces were made up by polymerizing diallyl phenylphosphonate with 2% benzoyl peroxide catalyst at 80–90° C. for 15 to 20 hours; the resins being cast and polymerized in shapes suitable for the preparation of standard test pieces for the physical testing of their properties. These pieces were tested in accordance with the methods outlined in Federal Specifications for Plastics, Organic: General specifications, test methods. L–P–406a, January 24, 1944, and the American Society of Testing Materials Standards 1944. The results of these tests are given in the following table:

Tensile strength, 5,300 lb./sq. in. (Fed. Spec. L–P–406 A, method No. 1011).
Compressive strength, 21,100 lb./sq. in. (A. S. T. M. Std. D–695–44 T).
Compressive strength, 16,100 lb./sq. in. (Fed. Spec. L–P–406 A, method No. 1021).
Flexural strength, 6,000 lb./sq. in. (Fed. Spec. L–P–406 A, method No. 1031).
Impact strength (notched Izod), 0.24 ft. lb./in. of notch (Fed. Spec. L–P–406 A, method No. 1071).
Rockwell hardness, M–95 (Fed. Spec. L–P–406 A, method No. 1081).
Distortion point, 216° F. (Fed. Spec. L–P–406 A, method No. 2011).
Water absorption, 0.66% in 24 hours (A. S. T. M. Std. D–570–42).
Deformation, 10.25% at 122° F. (4,000 lb./sq. in.—24 hrs.) (A. S. T. M. Std. D–621–44 T, method A).
Dielectric strength, 54.5 kilovolts at puncture 0.1710" thick test plate (Fed. Spec. L–P–406 A, method No. 4031).
Flammability, Extinguishes itself in 30 seconds after removal of flame (Fed. Spec. L–P–406 A, method No. 2021).

The above tests show the new resins to have physical properties which should make them quite valuable for many commercial applications.

While the above examples and discussion have been largely confined to resins and partial resins obtained by the polymerization of individual esters, it has been found that the various monomeric starting esters disclosed can be mixed in all proportions and copolymerized to form satisfactory hard, tough, light colored, solid resin products. For example a 50–50 mixture of diallyl phenylphosphonate and dimethallyl phenylphosphonate containing 2% by weight of benzoyl peroxide catalyst was polymerized at 80–90° C. to give a hard, tough, substantially water-white, glass-like resin.

The foregoing detailed description has been given for clearness of understanding only, and no unnecessary limitation should be understood therefrom.

What I claim as new and desire to secure by Letters Patent is:

1. The method of forming a polymer of a beta, gamma dialkenyl arylphosphonate ester of the class consisting of diallyl and dimethallyl phenyl, tolyl, chlorophenyl, and chlorotoyl phosphonate which comprises mixing the ester with a polymerization catalyst and heating the mixture at a polymerizing temperature of at least 70° C. for a sufficient period to effect the desired degree of polymerization.

2. The method as set forth in claim 1 in which the ester is a diallyl ester.

3. The method of producing hard, tough, glass-like resin products which comprises heating a mixture of a beta, gamma dialkenyl arylphosphonate ester of the class consisting of diallyl and dimethallyl phenyl, tolyl, chlorophenyl, and chlorotolyl phosphonate and a catalyzing proportion of an organic peroxide, at a temperature of 70–90° C. until the mass forms a gel, and then heating at 90–120° C. until the mass solidifies into a hard, glass-like product.

4. The method as set forth in claim 3 in which the ester is a diallyl phenylphosphonate.

5. A polymer of a beta, gamma dialkenyl arylphosphonate ester of the class consisting of diallyl and dimethallyl phenyl, tolyl, chlorophenyl, and chlorotolyl phosphonate.

6. A copolymer of a plurality of esters with each ester of the copolymer being a beta, gamma dialkenyl arylphosphonate ester of the class consisting of diallyl and dimethallyl phenyl, tolyl, chlorophenyl, and chlorotolyl phosphonate.

7. A polymer of diallyl phenylphosphonate.

8. A polymer of dimethallyl phenylphosphonate.

9. A polymer of diallyl chlorophenylphosphonate.

10. The method of forming polymers of a beta, gamma dialkenyl arylphosphonate ester of the class consisting of diallyl and dimethallyl phenyl, tolyl, chlorophenyl and chlorotolyl phosphonates which comprises mixing said ester with from 1 to 5 per cent by weight of benzoyl peroxide and heating the mixture at a temperature of about 70 to 100° C.

11. A solid laminated composition comprising layers of fabric made from fibers with the space between fibers and between layers of fabric being at least partially filled with a solid polymer of a beta, gamma dialkenyl arylphosphonate ester of the class consisting of diallyl and dimethallyl phenyl, tolyl, chlorophenyl, and chlorotolyl phosphonate.

12. The composition of claim 11 wherein the ester is diallyl phenylphosphonate.

13. The method of forming a copolymer which comprises mixing a polymerization catalyst with at least two beta, gamma dialkenyl arylphosphonate esters, each ester being a member of the class consisting of diallyl and dimethallyl phenyl, tolyl, chlorophenyl and chlorotolyl phosphonates, and heating the mixture at a polymerizing temperature of at least 70° C. for a sufficient period to effect the desired degree of polymerization.

14. The method of forming a polymer of a beta, gamma dialkenyl arylphosphonate ester of the class consisting of diallyl and dimethallyl phenyl, tolyl, chlorophenyl, and chlorotolyl phosphonates which comprises mixing the ester with an organic peroxide polymerization catalyst, and polymerizing at least in part in an inert atmosphere at a temperature of about 70 to 100° C.

ARTHUR DOCK FON TOY.

REFERENCES CITED

The following references are of record in the file of this patent:

UNITED STATES PATENTS

| Number | Name | Date |
|---|---|---|
| 2,139,394 | Van Peski | Dec. 6, 1938 |
| 2,270,285 | Frolich | Jan. 20, 1942 |
| 2,273,891 | Pollack et al. | Feb. 24, 1942 |
| 2,389,576 | Kosolapoff | Nov. 20, 1945 |
| 2,425,765 | Fon Toy | Aug. 19, 1947 |